US012392879B2

(12) United States Patent
Zhang et al.

(10) Patent No.: US 12,392,879 B2
(45) Date of Patent: Aug. 19, 2025

(54) RADAR SYSTEM TO UNIVERSALLY DETECT DIRECTION-OF-ARRIVAL OR DIRECTION-OF-DEPARTURE ANGLES IN DIRECT-PATH AND MULTIPATH REFLECTION CONDITIONS

(71) Applicant: Aptiv Technologies AG, Schaffhausen (CH)

(72) Inventors: Xin Zhang, Agoura Hills, CA (US); Zhengzheng Li, Agoura Hills, CA (US); Yu Zhang, Thousand Oaks, CA (US)

(73) Assignee: Aptiv Technologies AG, Schaffhausen (CH)

( * ) Notice: Subject to any disclaimer, the term of this patent is extended or adjusted under 35 U.S.C. 154(b) by 368 days.

(21) Appl. No.: 18/176,295

(22) Filed: Feb. 28, 2023

(65) Prior Publication Data

US 2024/0288562 A1   Aug. 29, 2024

(51) Int. Cl.
*G01S 13/00* (2006.01)
*G01S 13/68* (2006.01)
*G01S 13/931* (2020.01)

(52) U.S. Cl.
CPC ............ *G01S 13/003* (2013.01); *G01S 13/68* (2013.01); *G01S 13/931* (2013.01)

(58) Field of Classification Search
CPC ...... G01S 13/003; G01S 13/68; G01S 13/931; G01S 7/03; G01S 13/42; G01S 13/4454;
(Continued)

(56) References Cited

U.S. PATENT DOCUMENTS 5,657,027 A   8/1997  Guymon
7,474,262 B2  1/2009  Alland
(Continued)

FOREIGN PATENT DOCUMENTS

CN   106772224 A   5/2017
CN   111239678 A   6/2020
(Continued)

OTHER PUBLICATIONS

"Extended European Search Report", EP Application No. 22197753. 1, Mar. 7, 2023, 17 pages.
(Continued)

*Primary Examiner* — Vladimir Magloire
*Assistant Examiner* — Naomi M Wolford
(74) *Attorney, Agent, or Firm* — Harness, Dickey & Pierce, P.L.C.

(57) ABSTRACT

This document describes a radar system to universally detect direct-of-arrival (DoA) and direction-of-departure (DoD) angles in direct-path and multipath reflection conditions. For example, a radar system includes a transmitter and receiver array with a first array forming a minimum redundancy array and a second array forming a sparse uniform linear array. A processor determines, using second-array measurements, estimated angles. The quantity of estimated angles is larger than the quantity of actual angles due to angular ambiguity of the second array. The processor then identifies multiple potential sets of actual angles from among the estimated angles and tests each set under a maximum likelihood criterion using first-array measurements. The DoA and DoD angles are identified as the respective set with a maximum utility function value. In this way, the processor determines actual angles with improved resolution and reduced cost without having to identify whether a direct-path or multipath reflection condition exists.

20 Claims, 6 Drawing Sheets

(58) Field of Classification Search
CPC ........... G01S 13/87; G01S 2013/93271; G01S 2013/93272; G01S 2013/93274; G01S 3/16; G01S 13/62

See application file for complete search history.

(56) References Cited

U.S. PATENT DOCUMENTS

| | | |
|---|---|---|
| 7,639,171 B2 | 12/2009 | Alland et al. |
| 9,395,727 B1 | 7/2016 | Smith et al. |
| 9,869,762 B1 | 1/2018 | Alland et al. |
| 10,416,680 B2 | 9/2019 | Li et al. |
| 10,446,923 B2 | 10/2019 | Watson |
| 10,809,737 B2 | 10/2020 | Li et al. |
| 10,866,304 B1 | 12/2020 | Hassibi et al. |
| 11,619,705 B2 | 4/2023 | Zhang et al. |
| 11,635,506 B2 | 4/2023 | Iwasa et al. |
| 2017/0029107 A1 | 2/2017 | Emami et al. |
| 2017/0149147 A1 | 5/2017 | Minami et al. |
| 2018/0149736 A1 | 5/2018 | Alland et al. |
| 2019/0285738 A1 | 9/2019 | Iwasa et al. |
| 2019/0324133 A1 | 10/2019 | Hong et al. |
| 2020/0004262 A1 | 1/2020 | Li et al. |
| 2020/0256947 A1 | 8/2020 | Motoda |
| 2020/0292690 A1 | 9/2020 | Kim et al. |
| 2020/0309899 A1 | 10/2020 | Jonas et al. |
| 2020/0355816 A1 | 11/2020 | Ishikawa |
| 2021/0373144 A1 | 12/2021 | Amani et al. |
| 2022/0146623 A1* | 5/2022 | Lao .................. G01S 13/44 |
| 2022/0163623 A1 | 5/2022 | Kishigami et al. |
| 2022/0236370 A1 | 7/2022 | Li et al. |

FOREIGN PATENT DOCUMENTS

| | | |
|---|---|---|
| EP | 2662699 A1 | 11/2013 |
| EP | 3757607 A1 | 12/2020 |
| EP | 4036600 A1 | 8/2022 |
| EP | 4043919 A1 | 8/2022 |
| JP | 6523350 B2 | 5/2019 |
| JP | 2020186972 A | 11/2020 |
| WO | 2021096889 A1 | 5/2021 |

OTHER PUBLICATIONS

Zhang, et al., "Flexible Array Response Control via Oblique Projection", IEEE Transactions on Signal Processing, vol. 67, No. 12, Jun. 15, 2019, pp. 3126-3139.

"Extended European Search Report", EP Application No. 22200994.6, Aug. 11, 2023, 15 pages.

"Extended European Search Report", EP Application No. 23158330.3, Aug. 25, 2023, 17 pages.

Wu, et al., "A Low Complexity Adaptive Algorithm for Eigenspace-Based Two-Dimensional Direction of Arrival Tracking", IEICE Transactions on Fundamentals of Electronics, Communications and Computer Sciences, vol. E92-A, No. 8, Aug. 1, 2019, pp. 2097-2106.

"Extended European Search Report", EP Application No. 23165460.9, Sep. 15, 2023, 16 pages.

"Extended European Search Report", EP Application No. 21196393.9, Feb. 28, 2022, 11 pages.

"Extended European Search Report", EP Application No. 21196394.7, Mar. 4, 2022, 11 pages.

"Extended European Search Report", EP Application No. 21215410.8, Jul. 12, 2022, 9 pages.

"Extended European Search Report", EP Application No. 21216318.2, May 30, 2022, 10 pages.

"Extended European Search Report", EP Application No. 21216322.4, Jun. 3, 2022, 9 pages.

Amin, et al., "Sparse Arrays and Sampling for Interference Mitigation and DOA Estimation in GNSS" Proceedings of the IEEE, vol. 104, No. 6, Jun. 2016, pp. 1302-1317.

Capon, "High-Resolution Frequency-Wavenumber Spectrum Analysis", Proceedings of the IEEE, vol. 57, No. 8, Aug. 1969, pp. 1408-1418.

Chan, et al., "A parameter estimation approach to estimation of frequencies of sinusoids", Apr. 1981, pp. 214-219, 6 pages.

Chen, et al., "A new method for joint DOD and DOA estimation in bistatic MIMO radar", Feb. 2010, pp. 714-718.

Engels, et al., "Automotive MIMO Radar Angle Estimation in the Presence of Multipath", Oct. 2017, 4 pages.

Feger, et al., "A 77-GHz FMCW MIMO Radar Based on an SiGe Single-Chip Transceiver", IEEE Transactions on Microwave Theory and Techniques, vol. 57, No. 5, May 2009, pp. 1020-1035.

Gu, et al., "Adaptive Beamforming via Sparsity-Based Reconstruction of Covariance Matrix", Compressed Sensing in Radar Signal Processing, 2019, 33 pages.

Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, Feb. 2007, 4 pages.

Gu, et al., "Robust Adaptive Beamforming Based on Interference Covariance Matrix Reconstruction and Steering Vector Estimation", IEEE Transactions on Signal Processing, vol. 60, No. 7, Jul. 2012, pp. 3881-3885.

Gu, et al., "Robust Adaptive Beamforming Based on Interference Covariance Matrix Sparse Reconstruction", Signal Processing, vol. 96, Mar. 1, 2014, pp. 375-381.

Haardt, et al., "Unitary ESPRIT: How to Obtain Increased Estimation Accuracy with a Reduced Computational Burden", May 1995, 1232-1242.

Jiang, et al., "Joint DOD and DOA Estimation for Bistatic MIMO Radar in Unknown Correlated Noise", Nov. 2015, pp. 5113-5125.

Jin, et al. "Joint DOD and DOA estimation for bistatic MIMO radar", Feb. 2009, pp. 244-251.

Kikuchi, et al., "Pair-Matching Method for Estimating 2-D Angle of Arrival With a Cross-Correlation Matrix", IEEE Antennas and Wireless Propagation Letters, vol. 5, pp. 35-40, Mar. 2006, 6 pages.

Mcglaning, "Multipath Propagation", Wireless Receiver Design for Digital Communications—Chapter 3., Jan. 2012, pp. 190-206.

Moffet, "Minimum-Redundancy Linear Arrays", IEEE Transactions on Antennas and Propagation, vol. AP-16, No. 2., Mar. 1968, pp. 172-175.

Pursuant to MPEP § 2001.6(b) the applicant brings the following co-pending application to the Examiner's attention: U.S. Appl. No. 17/075,632.

Qian, et al., "Enhanced PUMA for direction-of-arrival estimation and its performance analysis", Aug. 15, 2016, pp. 4127-4137, 11 pages.

Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.

Roy, et al., "ESPRIT—Estimation of Signal Parameters Via Rotational Invariance Techniques", Jul. 1989, pp. 984-995.

Scheiner, et al., "Seeing Around Street Corners: Non-Line-of-Sight Detection and Tracking In-the-Wild Using Doppler Radar", Dec. 2019, pp. 2068-2077.

Schmidt, "Multiple Emitter Location and Signal Parameter Estimation", IEEE Transactions on Antennas and Propagation, Mar. 1986, pp. 276-280.

Shi, et al., "Sparsity-Based Two-Dimensional DOA Estimation for Coprime Array: From Sum-Difference Coarray Viewpoint", IEEE Transactions on Signal Processing, vol. 65, No. 21, Nov. 1, 2017, pp. 5591-5604.

Steinwandt, et al., "Performance Analysis of ESPRIT-Type Algorithms for Co-Array Structures", Dec. 10, 2017, 5 pages.

Sun, et al., "MIMO Radar for Advanced Driver-Assistance Systems and Autonomous Driving: Advantages and challenges", Jul. 2020, pp. 98-117.

Tropp, et al., "Signal Recovery From Random Measurements Via Orthogonal Matching Pursuit", IEEE Transactions on Information Theory, vol. 53, No. 12, Dec. 2007, pp. 4655-4666, Dec. 2007, 12 pages.

(56) References Cited

OTHER PUBLICATIONS

Vaidyanathan, et al., "Sparse Sensing with Co-Prime Samplers and Arrays", IEEE Trans. Signal Process., vol. 59, No. 2, Feb. 2011, pp. 573-586.

Vaidyanathan, et al., "Theory of Sparse Coprime Sensing in Multiple Dimensions", IEEE Transactions on Signal Processing, vol. 59, No. 8, Aug. 2011, pp. 3592-3608.

Van Trees, "Planar Arrays and Apertures", Essay in "Detection, Estimation, and Modulation Theory, Optimum Array Processing", pp. 231-274. Wiley-Interscience, May 2002, 44 pages.

Visentin, et al., "Analysis of Multipath and DOA Detection Using a Fully Polarimetric Automotive Radar", Apr. 3, 2018, pp. 570-577.

Wang, et al., "Two-Dimensional Beamforming Automotive Radar with Orthogonal Linear Arrays", 2019 IEEE Radar Conference, Boston, MA, Apr. 22-26, 2019., 6 pages.

Yu, et al., "MIMO Adaptive Beamforming for Nonseparable Multipath Clutter Mitigation", IEEE Transactions on Aerospace and Electronic Systems, vol. 50, No. 4, Oct. 2014, pp. 2604-2618.

Zhou, et al., "A Robust and Efficient Algorithm for Coprime Array Adaptive Beamforming", IEEE Transactions on Vehicular Technology, vol. 67, No. 2, Feb. 2018, pp. 1099-1112.

Zoltowski, et al., "Closed-Form 2-D Angle Estimation with Rectangular Arrays in Element Space or Beamspace via Unitary ESPRIT", Feb. 1996, pp. 316-328.

Zoltowski, et al., "ESPRIT-Based 2-D Direction Finding with a Sparse Uniform Array of Electromagnetic Vector Sensors", Aug. 1, 2000, pp. 2195-2204.

\* cited by examiner

RADAR SYSTEM TO UNIVERSALLY DETECT DIRECTION-OF-ARRIVAL OR DIRECTION-OF-DEPARTURE ANGLES IN DIRECT-PATH AND MULTIPATH REFLECTION CONDITIONS

BACKGROUND

Radar systems use antennas to transmit and receive electromagnetic (EM) signals for detecting and tracking objects. In automotive applications, radar systems operate in dynamic environments that can cause EM signals to have direct-path and multipath reflections. A direct-path reflection occurs when an EM signal travels directly between a radar system and a target (e.g., another vehicle) without an intervening reflection. A multipath reflection occurs when the EM signal encounters a reflective surface (e.g., a wall, barrier, fence, guardrail, semi-truck, automobile) between the radar system and the target; a multipath reflection may cause the direction of departure (DoD) for a transmitted EM signal to differ from the direction of arrival (DoA) for a corresponding reflected EM signal. If the DoD is not equal to the DoA, a multiple-input and multiple-output (MIMO) radar system generally cannot generate a synthetic array that provides the radar system with a larger aperture than the corresponding physical array.

SUMMARY

This document describes techniques and systems to enable a radar system to universally detect DoA and DoD angles when direct-path and multipath reflections coexist. In some examples, a radar system for installation on a vehicle includes a transmitter array, a receiver array, and at least one processor. A first array of the receiver array or the transmitter array forms a minimum redundancy array or other sparse array without angle ambiguity. A second array of the receiver array or the transmitter array forms a sparse uniform linear array. The processor is configured to generate a two-dimensional (2D) data matrix by sampling EM energy received at the receiver array. The processor uses second-array measurements in the 2D data matrix to determine estimated angles associated with radar detections of reflecting objects. Using the estimated angles, the processor can determine the quantity of actual angles associated with the radar detections, with the quantity of actual angles generally being smaller than the quantity of the estimated angles due to the angular ambiguity of the second array. The processor then identifies multiple potential sets of actual angles using the estimated angles. The processor tests each potential set of actual angles under a maximum likelihood criterion using first-array measurements to determine utility function values for the multiple potential sets of actual angles. The actual angles associated with the radar detections are identified as the specific potential set of actual angles with the maximum utility function value. In this way, the described techniques and systems can enable a radar system to detect angles associated with objects in direct-path and multipath reflection scenarios without having to differentiate between the different reflection conditions and with a virtual array providing improved angular resolution and reduced cost.

This document also describes methods performed by the above-summarized system and other configurations of the radar system set forth herein and means for performing these methods.

This Summary introduces simplified concepts related to enabling a radar system to universally detect DoA and DoD angles in direct-path and multipath reflection conditions, and are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a radar system to universally detect DoA or DoD angles in direct-path and multipath reflection conditions are described in this document with reference to the following figures. The same numbers are often used throughout the drawings to reference like features and components.

DETAILED DESCRIPTION

Overview

Figure 1:
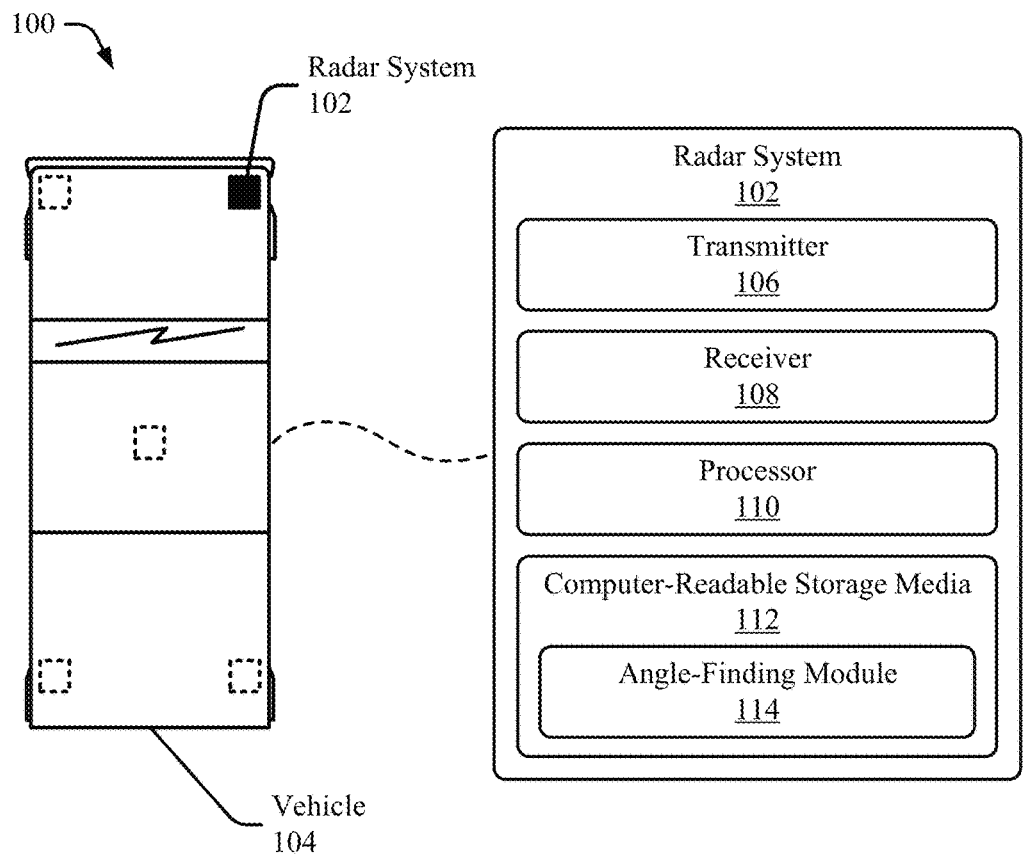
FIG. 1 illustrates an example environment in which a radar system can universally detect DoA or DoD angles in direct-path and multipath reflection conditions in accordance with techniques of this disclosure.
Figure 1:
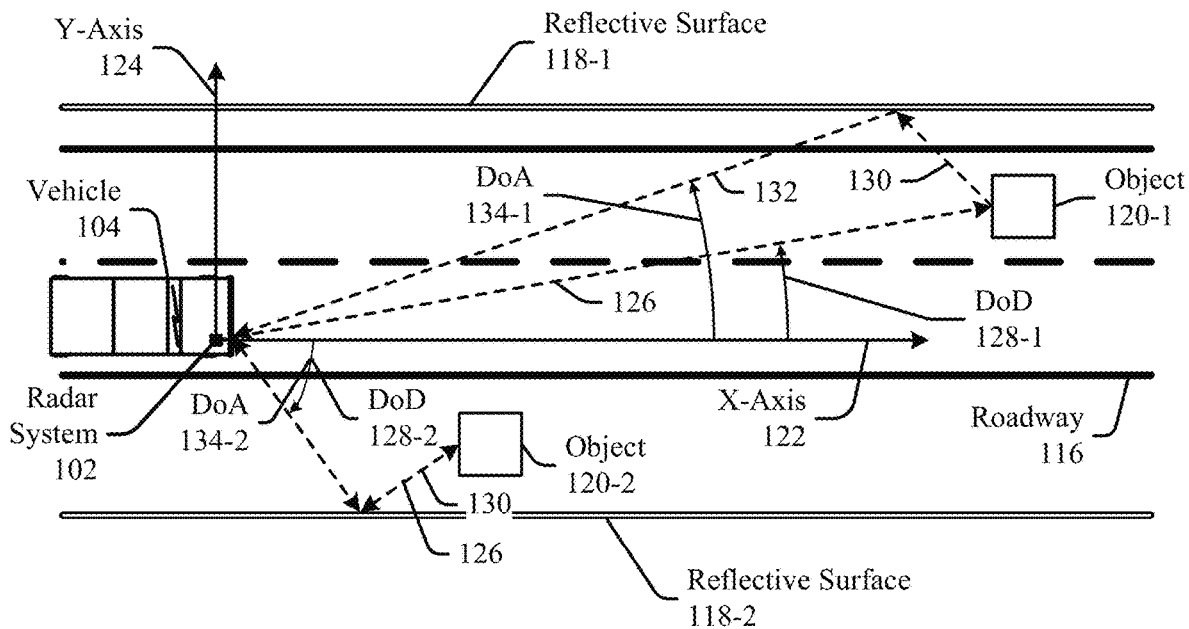

Radar systems can be configured as an important sensing technology that vehicle-based systems use to acquire information about the surrounding environment. For example, vehicle-based systems may use radar systems to detect objects in or near a roadway and, if necessary, take necessary actions (e.g., reduce speed, change lanes) to avoid a collision.

Radar systems generally include at least two antennas to transmit and receive EM radiation. Some automotive radar systems operate multiple-input and multiple-output (MIMO) radars in crowded environments to obtain reliable detections of nearby objects. Multipath reflections can occur when a reflective surface (e.g., a wall, fence, barrier, guardrail, another vehicle) reflects an EM signal. In real-world scenarios, up to half of the detections by automotive radar systems include multipath reflections. The multipath-reflection environment can result in several scenarios, including direct-path reflections, bistatic reflections, and two-way multipath reflections. A direct-path reflection, which is an example of a monostatic reflection condition, occurs when a transmitted and reflected EM signal travels directly between the radar system and the object.

In contrast, a bistatic reflection condition occurs when a transmission takes a different trajectory or path to travel between a radar system and an object than the reflection takes, resulting in the DoD being different from the DoA. In contrast, a monostatic reflection condition occurs when the DoD is the same as the DoA, regardless of whether the transmission and reflection paths take a direct-path or multipath trajectory.

In bistatic reflection conditions, radar detections often cannot be used as reliable indicators, for example, to detect objects in a radar system field-of-view because a radar reflection has a DoA that is not equal to the DoD. The mismatch between the DoD and the DoA can violate a necessary condition for some MIMO radar systems to form a synthetic array. In other words, bistatic reflection conditions can mask the position of the reflecting object, which makes determining range and range rate for nearby objects difficult in a MIMO radar system.

Automotive radar systems often use MIMO radar systems to improve angular resolution. In MIMO, the radar system and/or processor forms a synthetic array with a larger aperture than the corresponding physical arrays. For example, a radar system can configure eight physical channels of a radar transceiver (e.g., two transmit channels and six receive channels) using MIMO to provide twelve channels (or another number of channels) larger than the number of physical channels. With additional channels, a MIMO radar system can operate with an improved angular resolution, relying on a flexible physical layout of inexpensive and possibly fewer hardware components than traditional non-MIMO radar systems.

However, a radar system often cannot form a synthetic array using MIMO if the DoD is different from the DoA. If a bistatic reflection condition exists, the DoD is not equal to the DoA. As a result, radar detections cannot easily be mapped to a corresponding antenna element of a synthetic array, resulting in errors using MIMO techniques to detect and track objects. The DoD-DoA mismatch can also lead to saturation or overconsumption of computing resources. At best, the saturation may merely delay a radar system output; at worst, the output includes errors from incorrectly mapping a surrounding environment, which can cause an automotive system or an operator of a vehicle to drive in an unsafe manner, for example, by driving too closely to objects that are not accurately tracked or operating the vehicle too gingerly by leaving an exaggerated buffer between the vehicle and the objects.

Some radar systems address bistatic reflection conditions using polarimetric antennas, constrained spacing among antenna elements, and/or multiple data snapshots over a period of time. For example, some radar systems use polarimetric antennas to analyze bistatic reflection scenarios. Often, these systems can accurately distinguish monostatic reflection scenarios from bistatic reflection scenarios only if the target is known. These systems also rely on more-expensive polarimetric antennas. Other radar systems can only distinguish bistatic reflection conditions from monostatic reflection conditions using multiple data snapshots (e.g., more than one hundred snapshots) and an antenna spacing of half the transmitted wavelength (e.g., $0.5\lambda$) for both the transmitter and receiver array. Because automotive radar systems generate a single snapshot for each detection while a vehicle moves, such systems are generally inapplicable to automotive applications. These systems also require a relatively large number of antenna elements to satisfy the half-wavelength spacing and have a sufficiently large aperture at the same time.

In contrast, this document describes techniques and systems to enable a radar system to universally detect DoA or DoD angles in direct-path and multipath reflection scenarios, regardless of whether monostatic or bistatic reflection conditions exist. For example, a radar system includes a transmitter array and a receiver array. A first array of the transmitter array or the receiver array forms a minimum redundancy array with a minimum spacing of half a wavelength of the EM carrier wave or another array without angular ambiguity. The second (or other) array is a sparse uniform linear array. A processor of the radar system generates a 2D data matrix by sampling the EM energy received at the receiver array. The processor determines, using EM energy measurements in the 2D data matrix associated with the second array, estimated angles (e.g., DoA or DoD estimates) associated with radar detections of one or more reflecting objects. The quantity of the estimated angles is larger than the quantity of actual angles due to angular ambiguity in the second array. In fact, the estimated angles include one or more aliased angles and one or more actual angles associated with the radar detections, which correspond to direct-path or multipath reflections of the EM energy by the objects. The processor also determines the quantity of actual angles from the number of estimated angles or a model order selection approach.

The processor then identifies multiple potential sets of actual angles from the pool of estimated angles. Each potential set of actual angles is tested under a maximum likelihood criterion using the EM energy measurements in the 2D data matrix associated with the first array (e.g., to determine a utility function value for each potential set of actual angles). The actual angles are determined as the potential set of actual angles with the maximum utility function value. In this way, the described systems and techniques utilize MIMO techniques to reduce the number of antenna elements while preserving the angular resolution that can otherwise be achieved using a synthetic array. The radar system can also be used in automotive radar applications as a low-cost and computationally efficient solution only requiring a single data snapshot and without needing to distinguish between direct-path and multipath reflection conditions.

This example is just one example of the described techniques and systems of a radar system that can universally detect DoA or DoD angles in direct-path and multipath reflection conditions. This document describes other examples and implementations.

Operating Environment

FIG. 1 illustrates an example environment 100 in which a radar system 102 can universally detect DoA or DoD angles in direct-path and multipath reflection conditions in accordance with techniques of this disclosure. In the depicted environment 100, the radar system 102 is mounted to, or installed within, a vehicle 104 traveling on a roadway 116. Within an instrumental field-of-view, the radar system 102 can detect one or more objects 120 (e.g., an object 120-1 and another object 120-2) near or surrounding the vehicle 104. The radar system 102 emits radar signals with a direction-of-departure (DoD) 128 (e.g., DoD 128-1 and DoD 128-2) and receives corresponding radar reflections with a direction-of-arrival (DoA) 134 (e.g., DoA 134-1 and DoA 134-2). The radar system 102 can detect the objects 120 in the vicinity of the vehicle 104.

Although illustrated as a passenger truck, the vehicle 104 can represent other types of motorized vehicles (e.g., a car, an automobile, a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 102 to any moving platform, including moving machinery or robotic equipment.

In the depicted implementation, the radar system 102 is mounted on the front of the vehicle 104 and illuminates the objects 120. The radar system 102 can detect the objects 120 from any exterior surface of the vehicle 104. For example, vehicle manufacturers can integrate the radar system 102 into a bumper, side mirror, headlights, rear lights, or any other interior or exterior location from where the objects 120 require detection. In some cases, the vehicle 104 includes multiple radar systems 102, such as a first radar system 102 and a second radar system 102, that provide a larger instrumental field-of-view. In general, vehicle manufacturers can design the locations of the one or more radar systems 102 to provide a particular field-of-view that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The objects 120 are composed of one or more materials that reflect radar signals. Depending on the application, the objects 120 can represent targets of interest. In some cases, the objects 120 may be moving objects (e.g., other vehicles) or stationary objects (e.g., roadside signs, road barriers, debris).

The radar system 102 emits EM radiation by transmitting EM signals or waveforms via antenna elements. In the environment 100, the radar system 102 detects and tracks the objects 120-1 and 120-2 by transmitting and receiving one or more radar signals. For example, the radar system 102 can transmit EM carrier waves between one hundred and four hundred gigahertz (GHz), between four and one hundred GHz, or between approximately seventy and eighty GHz.

The radar system 102 includes a transmitter 106 to transmit EM signals. The radar system 102 also includes a receiver 108 to receive reflected versions of the EM signals. The transmitter 106 includes one or more components, including an antenna or antenna elements, for emitting the EM signals. The receiver 108 includes one or more components, including an antenna or antenna elements, for detecting the reflected EM signals. The transmitter 106 and the receiver 108 can be incorporated together on the same integrated circuit (e.g., a transceiver integrated circuit) or separately on different integrated circuits. In other implementations, the radar system 102 does not include a separate antenna, but the transmitter 106 and the receiver 108 each include one or more antenna elements. The radar system 102 may operate as a MIMO radar system.

The radar system 102 also includes one or more processors 110 (e.g., an energy processing unit or an electronic control unit) and computer-readable storage media (CRM) 112. The processor 110 may be a microprocessor or a system-on-chip. The processor 110 executes instructions stored in the CRM 112. For example, the processor 110 processes EM energy received by the receiver 108 and determines, using an angle-finding module 114, a location of the objects 120 relative to the radar system 102. The processor 110 may also generate radar data for at least one automotive system. For example, the processor 110 can control, based on processed EM energy from the receiver 108, an autonomous or semi-autonomous driving system of the vehicle 104.

The angle-finding module 114 obtains EM energy received by the receiver 108 and determines angles associated with the objects 120 regardless of whether the reflections include direct-path or multipath reflection conditions. In particular, the radar system 102 determines, using the angle-finding module 114, a location of the object 120-1 in terms of the DoD 128-1 and/or the DoA 134-1 based on the direction of one or more large-amplitude echo signals received by the radar system 102. Similarly, the radar system 102 determines, using the angle-finding module 114, a location of the object 120-2 in terms of the DoD 128-2 and the DoA 134-2 based on the direction of one or more large-amplitude echo signals received by the radar system 102. The radar system 102 can implement the angle-finding module 114 as instructions in the CRM 112, hardware, software, or a combination thereof executed by the processor 110.

As illustrated in the example environment 100, FIG. 1 illustrates the vehicle 104 traveling on the roadway 116. A reflective surface 118-1 is near or in the roadway 116 to the left of the vehicle 104. Another reflective surface 118-2 is near or in the roadway 116 to the right of the vehicle 104. The reflective surfaces 118 may be a wall, guardrail, fence, building, or another vehicle. The radar system 102 detects the objects 120 in front of the vehicle 104. The radar system 102 may define a sensor or vehicle coordinate system with an x-axis 122 (e.g., in a forward direction along the roadway 116) and a y-axis 124 (e.g., perpendicular to the x-axis 122 and along a surface of the roadway 116). The transmitter 106 can transmit EM signals 126 in front of the vehicle 104. The objects 120 reflect the transmitted EM signals 126.

For example, the object 120-1 reflects the transmitted EM signal 126 as a reflected EM signal 130. The reflected EM signal 130 can travel directly back to the radar system 102 or be reflected by the reflective surface 118 as a reflected EM signal 132. The reflected EM signal 132 is received by the receiver 108. The angle-finding module 114 locates the object 120-1 by determining the DoD 128-1 and/or the DoA 134-1 associated with the EM signals. The DoD 128-1 and the DoA 134-1 represent a horizontal angle from the x-axis 122 to the object 120. For the object 120-1, the DoD 128-1 is not equal to the DoA 134-1 and a bistatic reflection condition exists.

For the object 120-2, the transmitted EM signal 126 is reflected back to the radar system 102 along the same multipath reflection path so that the DoD 128-2 is approximately equal to the DoA 134-2. In this scenario, the transmitted EM signal 126 is reflected by the reflective surface 118-2 and then reflected by the object 120-2. The reflected EM signal 130 is then reflected by the reflective surface 118-2 before being received by the radar system 102. In this two-way multipath reflection, the DoD 128-2 is approximately equal to the DoA 134-2 and a monostatic reflection condition exists.

The vehicle 104 can also include at least one automotive system (not illustrated in FIG. 1) that relies on data from the radar system 102, such as a driver-assistance system, an autonomous-driving system, or a semi-autonomous-driving system. The radar system 102 can include an interface to the automotive system that uses the radar data. For example, the processor 110 outputs, via the interface, a signal based on EM energy received by the receiver 108.

Generally, the automotive systems use radar data provided by the radar system 102 to perform a function. For example, the driver-assistance system can provide blind-spot monitoring and generate an alert that indicates a potential collision with the objects 120 that is detected by the radar system 102. The radar data from the radar system 102 indicates when it is safe or unsafe to change lanes in such an implementation. The autonomous-driving system may move the vehicle 104 to a particular location on the roadway 116 while avoiding collisions with the objects 120 detected by the radar system 102. The radar data provided by the radar system 102 may provide information about the distance to and the location of the objects 120 to enable the autonomous-driving system to perform emergency braking, perform a lane change, or adjust the speed of the vehicle 104.

Figure 2:
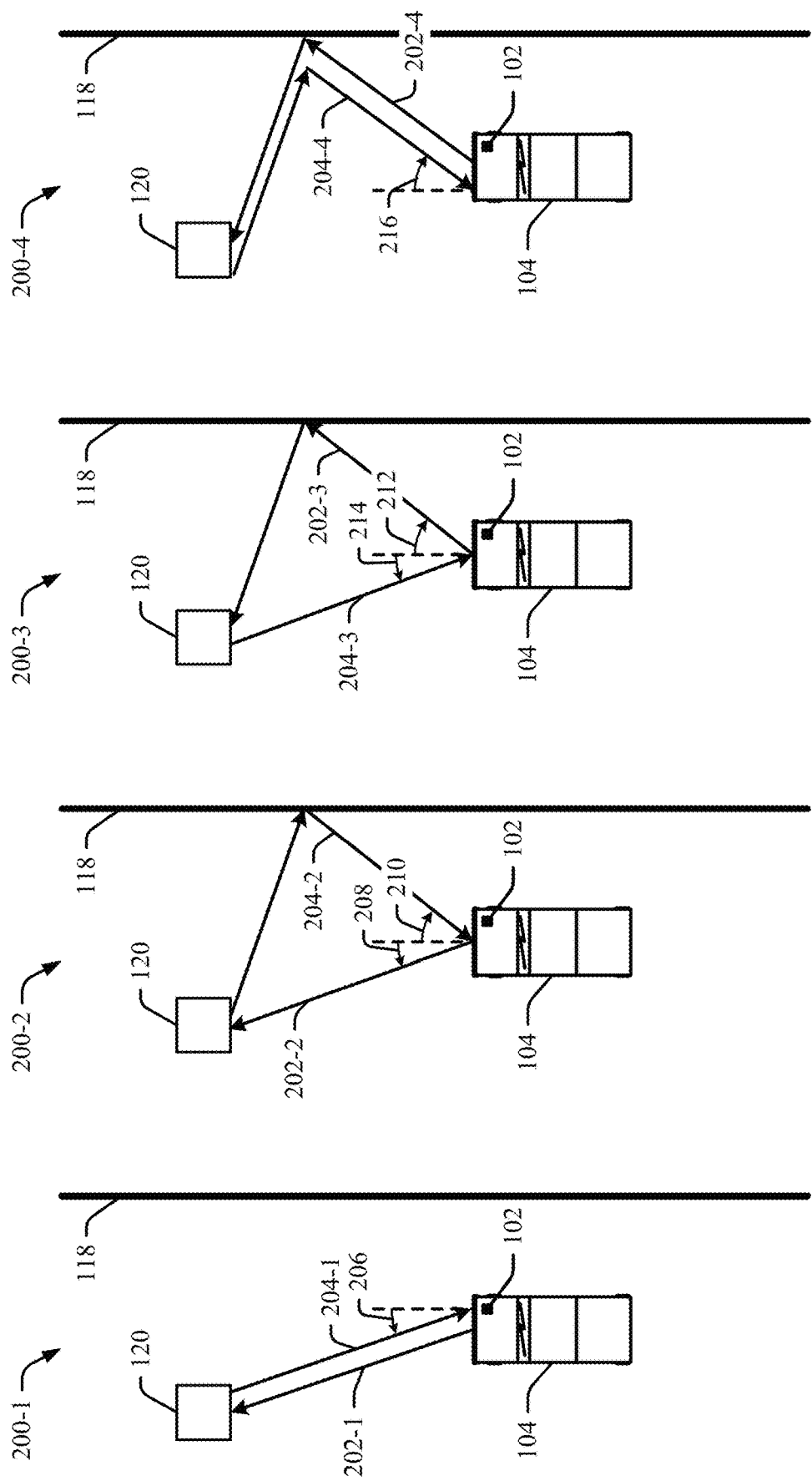
FIG. 2 illustrates different reflection conditions encountered by a vehicle with a radar system that can universally detect DoA or DoD angles in direct-path and multipath conditions in accordance with techniques of this disclosure.

FIG. 2 illustrates different detection conditions 200-1, 200-2, 200-3, and 200-4 encountered by the vehicle 104 with the radar system 102 that can universally detect DoA or DoD angles in direct-path and multipath reflection conditions in accordance with techniques of this disclosure. The object 120 can be at different positions relative to the vehicle 104. On the right side of vehicle 104, a reflective surface 118 (e.g., a guardrail, a railing, a construction zone boundary, a fence, another vehicle) exists. The radar system 102 detects the object 120 by emitting a radar signal 202-1, 202-2, 202-3, or 202-4, and receiving a reflected radar signal 204-1, 204-2, 204-3, or 204-4, respectively.

In the detection condition 200-1, a monostatic reflection condition exists for a direct-path transmission and a direct-path reflection of the EM signal. The radar system 102 transmits the radar signal 202-1 with a particular DoD angle. The corresponding reflected radar signal 204-1 is reflected by the object 120 to vehicle 104 with a particular DoA angle. The angle-finding module 114 determines that the DoA and the DoD angles are equal or approximately equal to an angle 206. Because the DoA and the DoD angles are equal or approximately equal, a bistatic reflection condition does not exist in front of vehicle 104 with respect to the object 120.

In the detection condition 200-2, a bistatic reflection condition exists for a direct-path transmission and a multipath reflection. The radar system 102 transmits the radar signal 202-2 with a DoD equal to an angle 208. The corresponding reflected radar signal 204-2 is reflected by the object 120 and the reflective surface 118 to the vehicle 104 with a DoA equal to an angle 210. Because the angle 208 is not equal to or approximately equal to the angle 210, the angle-finding module 114 determines that the DoA and the DoD are not equal, and therefore, a bistatic reflection condition exists in front of vehicle 104 with respect to the object 120. For many radar system a bistatic reflection condition violates a collocated MIMO assumption and a synthetic array cannot be used to estimate DoA and/or DoD angles.

In the detection condition 200-3, another bistatic reflection condition exists for a multipath transmission and a direct-path reflection. The radar system 102 transmits the radar signal 202-3 with a DoD equal to angle 212 toward the reflective surface 118. The corresponding reflected radar signal 204-3 is reflected by the object 120 to vehicle 104 with a DoA equal to angle 214. The angle-finding module 114 determines that the DoA and the DoD are not equal or approximately equal, and therefore, a bistatic reflection condition exists in front of vehicle 104 with respect to the object 120. The transmission path of the radar signal 202-3 is not equal to the transmission path of the reflected radar signal 204-3. The radar signals of the bistatic reflection conditions in the detection conditions 200-2 and 200-3 travel the same paths but in opposite directions. The total propagation path is equal in both bistatic reflection conditions.

In the detection condition 200-4, a monostatic reflection condition exists for a multipath transmission and a multipath reflection. The radar system 102 transmits the radar signal 202-4 with a DoD equal to angle 216 toward the reflective surface 118. The corresponding reflected return radar signal 204-4 is reflected by the object 120 and the reflective surface 118 to the vehicle 104 with a DoA equal to the angle 216. The angle-finding module 114 determines that the DoA and the DoD are equal, and therefore, a bistatic reflection condition does not exist in front of vehicle 104 with respect to the object 120. The transmission path of the radar signal 202-4 is equal to the transmission of the reflected radar signal 204-4.

The angle-finding module 114 can find multiple clusters of energy in range-Doppler detections (RDDs), including direct-path detection conditions, bistatic reflection conditions, and two-way multipath detection conditions. The angle-finding module 114 can use range-Doppler information to differentiate the bistatic reflection conditions (e.g., detection conditions 200-2 and 200-3) from the monostatic reflection conditions (e.g., detection conditions 200-1 and 200-4). However, the techniques described herein can universally determine DoA or DoD angles associated with each object without needing to differentiate bistatic reflection conditions from monostatic reflection conditions based on the observation that multipath reflections generally appear in pairs, as discussed in more detail with respect to FIG. 3.

Figure 3:
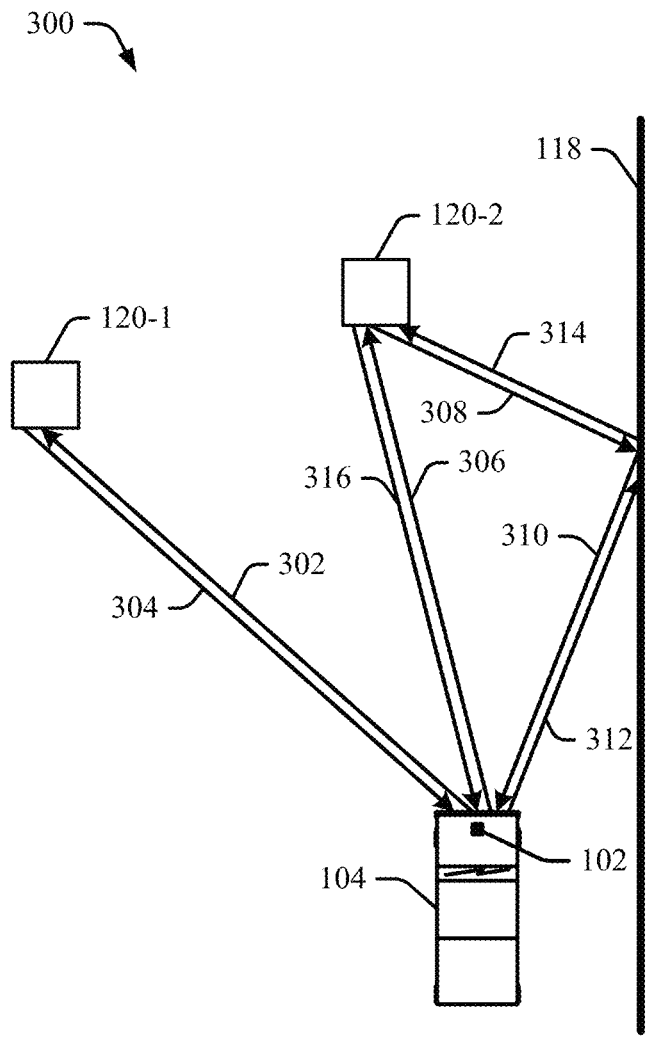
FIG. 3 illustrates reflection conditions with multiple objects encountered by a vehicle with a radar system that can universally detect DoA or DoD angles in direct-path and multipath conditions in accordance with techniques of this disclosure.

FIG. 3 illustrates detection condition 300 with multiple objects 120-1 and 120-2 encountered by the vehicle 104 with the radar system 102 that can universally detect DoA or DoD angles in direct-path and multipath reflection conditions in accordance with techniques of this disclosure. The objects 120-1 and 120-2 are at different positions relative to the vehicle 104. On the right side of vehicle 104, a reflective surface 118 (e.g., a guardrail, a railing, a construction zone boundary, a fence, another vehicle) exists. The radar system 102 detects the objects 120 by emitting a radar signal 302, 306, and 312 and receiving a reflected radar signal 304, 310, and 316, respectively.

For the object 120-1, a direct-path transmission and reflection condition exists. The radar system 102 transmits the radar signal 302 with a particular DoD angle. The corresponding reflected radar signal 304 is reflected by the object 120-1 to vehicle 104 with a particular DoA angle. The DoA and DoD angles are equal or approximately equal to one another.

For the object 120-2, both direct-path and multipath transmission and reflection conditions exist. The radar system 102 transmits the radar signal 306 with a first DoD angle. The object 120-2 reflects the radar signal 306 as a radar signal 308, which is reflected by the reflective surface 118 as radar signal 310. The radar system 102 receives the radar signal 310 with a first DoA angle. The radar system 102 also transmits the radar signal 312 with a second DoD angle, which is reflected by the reflective surface 118 as radar signal 314. The object 120-2 reflects the radar signal 314, which is received by the radar system 102 as the radar signal 316 with a second DoA angle. In this bistatic and multipath propagation scenario, the first DoD angle or the second DoD angle is not equal to the first DoA angle or the second DoA angle, respectively. However, because the paths of multipath propagations usually appear in pairs due to the propagation nature of EM signals, the paired paths overlap with each other and the radar signals travel along the paired paths in opposite directions. Utilizing the paired nature of propagation paths, the radar system 102 may determine the actual angles (e.g., DoA and DoD angles) associated with the objects 120 without determining whether they correspond to a direct-path or multipath propagation condition. Accordingly, when multipath reflection conditions exist, the set of DoD angles are equal or approximately equal to the set of DoA angles as represented by Equation (1):

$$\mathbb{D} = \mathbb{A} = \{\alpha_1, \alpha_2, \ldots, \alpha_K\}, \quad (1)$$

where $\mathbb{D}$ stands for the set of DoD angles, $\mathbb{A}$ stands for the set of DoA angles, $\alpha_k$ is the k-th intended angle, and K is the number of angles. For instance, K=3 in FIG. 3.

Figure 4:
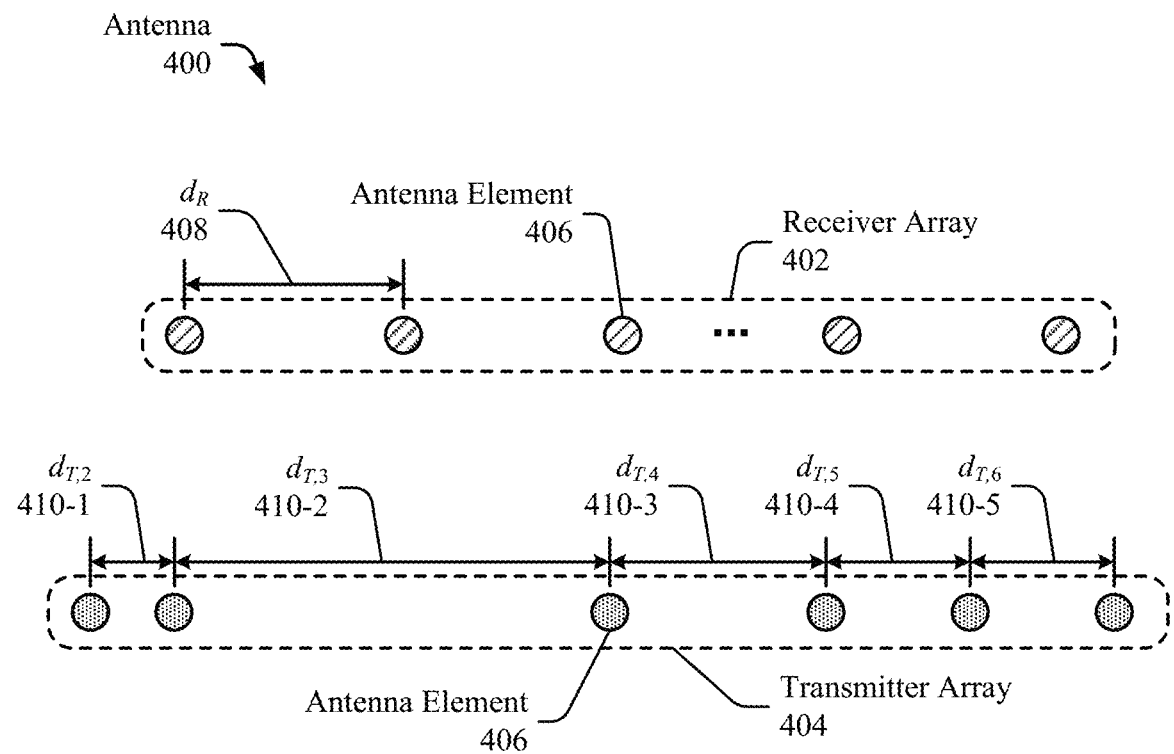
FIG. 4 illustrates an example antenna with a transmitter array and receiver array of antenna elements for a radar system that can universally detect DoA or DoD angles in direct-path and multipath reflection conditions.

FIG. 4 illustrates an example antenna 400 with a receiver array 402 and transmitter array 404 of antenna elements 406 for a radar system that can universally detect DoA or DoD angles in direct-path and multipath reflection conditions. For example, the radar system of FIG. 4 can be the radar system 102 of FIGS. 1 through 3. In the depicted implementation, the antenna 400 includes the receiver array 402 and the transmitter array 404 that can correspond to the receiver 108 and the transmitter 106, respectively, of FIG. 1.

The receiver array 402 is a sparse uniform linear array (ULA) that includes $N_R$ antenna elements 406 with a receiver spacing, $d_R$, 408 among the antenna elements 406. In this document, a sparse array has a spacing among antenna elements 406 that is greater than half the wavelength of the transmitted EM carrier wave (e.g., $d_R > 0.5\lambda$). In the depicted implementation, the receiver array 402 includes at least five antenna elements 406 (e.g., $N_R$ is equal to or greater than five). The receiver array 402 can also include additional or fewer antenna elements 406 in other implementations.

The transmitter array 404 is a sparse minimum redundancy array (MRA). MRAs achieve maximum aperture resolution for a particular number of antenna elements 406 by reducing the number of redundant spacings present among the antenna elements 406. The transmitter array 404 is a sparse array that does not have angle ambiguity (e.g., no grating lobes) within a 180 degree or negative-ninety-degree-to-ninety-degree (e.g., [−90°, 90°]) field-of-view. The transmitter array 404 includes $N_T$ antenna elements 406 with a transmitter spacing, $d_{T,i_T}$, 410, where $i_T=2, \ldots, N_T$ and $d_{T,i_T}$ denotes the spacing between the ($i_T$−1)th antenna element 406 and the $i_T$th antenna element 406. In the depicted implementation, the transmitter array 404 includes six antenna elements 406 (e.g., $N_T$ is equal to six). The transmitter array 404 can also include additional or fewer antenna elements 406 in other implementations.

The transmitter spacing, $d_{T,i_T}$, 410 are multiples of 0.5$\lambda$, where is the wavelength of the transmitted EM radiation or carrier wave. The transmitter spacing 410 can be represented using Equation (2):

$$d_{T,i_T} = m_{T,i_T} \times 0.5\lambda \quad (2)$$

where $m_{T,i_T} \in \mathbb{Z}^+$. For the described radar system 102, the transmitter spacing 410 provides a minimum redundancy array. For example, the depicted transmitter array 404 includes six antenna elements 406 with the $m_{T,i_T}$ of the transmitter spacing 410-1 (e.g., $d_{T,2}$), 410-2 (e.g., $d_{T,3}$), 410-3 (e.g., $d_{T,4}$), 410-4 (e.g., $d_{T,5}$), and 410-5 (e.g., $d_{T,6}$) equal to 1 (e.g., 0.5$\lambda$), 5 (e.g., 2.5$\lambda$), 3 (e.g., 1.5$\lambda$), 2 (e.g., 1.0$\lambda$), and 2 (e.g., 1.0$\lambda$), respectively. Other examples of a sparse MRA are provided in Table 1 below for different numbers, N, of antenna elements 406 with the transmitter spacing 410 provided in terms of $m_{T,i_T}$ as used in Equation (1) above. For sparse MRAs with 5, 6, 7, 8, or 10 antenna elements, Table 1 provides multiple example arrays with the first one or two examples being "restricted" examples where the spatial-frequency spectrum is uniformly covered up to a spacing $m_{MAX}$, which is also the distance between the end antenna elements of the array. The other examples included in Table 1 provide "general" examples of MRAs where the length of the array may be greater than the spacing $m_{MAX}$ and the remaining spacings are not all redundant beyond the $m_{MAX}$ spacing.

TABLE 1

| | Examples of MRAs | |
|---|---|---|
| N | Transmitter Spacing ($m_{T, i_T}$) | $m_{MAX}$ |
| 3 | [1, 2] | 4 |
| 4 | [1, 3, 2] | 6 |
| 5 | [1, 3, 3, 2] | 9 |
|  | [4, 1, 2, 6] | 9 |
| 6 | [1, 5, 3, 2, 2] | 13 |
|  | [6, 1, 2, 2, 8] | 13 |
| 7 | [1, 3, 6, 2, 3, 2] | 17 |
|  | [14, 1, 3, 6, 2, 5] | 18 |
| 8 | [1, 1, 9, 4, 3, 3, 2] | 23 |
|  | [1, 3, 6, 6, 2, 3, 2] | 23 |
|  | [8, 10, 1, 3, 2, 7, 8] | 24 |
| 9 | [1, 3, 6, 6, 6, 2, 3, 2] | 29 |
| 10 | [1, 2, 3, 7, 7, 7, 4, 4, 1] | 36 |
|  | [16, 1, 11, 8, 6, 4, 3, 2, 22] | 37 |

In the depicted implementation, the receiver array 402 is a sparse ULA and the transmitter array 404 is a sparse MIRA. In other implementations, the receiver array 402 is a sparse MIRA and the transmitter array is a sparse ULA.

In yet other implementations, the sparse MRA (e.g., the receiver array 402 or the transmitter array 404) may be replaced with a sparse array of antenna elements 406 that do not have angle ambiguity (e.g., no grating lobes) within a 180 degree or negative-ninety-degree-to-ninety-degree (e.g., [−90°, 900]) field-of-view. For example, the transmitter array 404 may be a paired staggered array to provide an array without angle ambiguity. In this design, the transmitter array 404 includes a sparse ULA of antenna elements 406 with a first spacing (e.g., 2.5$\lambda$). The transmitter array 404 also includes a copy of the ULA composed of antenna elements 406 with the same first spacing (e.g., 2.5$\lambda$), but offset from the first ULA by a second spacing (e.g., 1.0$\lambda$).

As another example, the transmitter array 404 may be a coprime array to provide an array without angle ambiguity. In this design, the transmitter array 404 includes two sparse ULAs of antenna elements 406 with a first spacing and a second spacing. The first and second spacings can each be represented by Equation (3), which is similar to Equation (2):

$$d_T = m_T \times 0.5\lambda \quad (3)$$

The first subarray includes N antenna elements and the value of $m_{T,1}$ for the first spacing, $d_{T,1}$ is M, where M and N are positive integers. The second subarray includes 2M antenna elements and the value of $m_{T,2}$ for the second spacing, $d_{T,2}$, is N. The integers M and N are coprime (e.g., M and N do not have common factors other than one). As one example, M and N can be equal to five and three, respectively.

As yet another example, the transmitter array 404 may provide an array without angle ambiguity by including at least one pair of transmitter antenna indices ($i_T, j_T$) and one pair of integers (P, Q) for a sparse array that satisfy Equation (4):

$$|Pm_{T,i_T} - Qm_{T,j_T}| = 1 \qquad (4)$$

where $i_T=2, \ldots, N_T$, $j_T=2, \ldots, N_T$, $i_T \neq j_T$, $P \in \mathbb{Z}^+$ and $Q \in \mathbb{Z}^+$. For example, the transmitter array 404 may include eight antenna elements with the $m_{T,i_T}$ of the transmitter spacing 410-1 (e.g., $d_{T,2}$), 410-2 (e.g., $d_{T,3}$), 410-3 (e.g., $d_{T,4}$), 410-4 (e.g., $d_{T,5}$), 410-5 (e.g., $d_{T,6}$), 410-6 (e.g., $d_{T,7}$), and 410-7 (e.g., $d_{T,8}$) being equal to 8 (e.g., 4.0λ), 4 (e.g., 2.0λ), 5 (e.g., 2.5λ), 2 (e.g., 1.0λ), 6 (e.g., 3.0λ), 3 (e.g., 1.5λ), and 7 (e.g., 3.5λ), respectively. In this example, the transmitter spacing 410-3 (e.g., $m_{T,4}=5$) and 410-2 (e.g., $m_{T,3}=4$) satisfy Equation (4), with P and Q both equal to one.

As another example, the transmitter array 404 may provide an array without angle ambiguity by including at least one spacing between adjacent antenna elements 406 that is equal to one half the wavelength of the EM carrier wave (λ/2).

In the depicted implementations, the receiver array 402 and the transmitter array 404 are positioned in an azimuth direction. In other implementations, the receiver array 402 and/or the transmitter array 404 can be positioned in an elevation direction or another direction. In addition, the receiver array 402 and/or the transmitter array 404 may be two-dimensional arrays.

The receiver array 402 and the transmitter array 404 may be planar arrays that provide high gain and low loss. Planar arrays are well-suited for vehicle integration due to their small size. For example, the antenna elements 406 can be slots etched or otherwise formed in a plating material of one PCB surface for a substrate-integrated waveguide (SIW) antenna. The antenna elements 406 can also be part of an aperture antenna, a microstrip antenna, or a dipole antenna. For example, the receiver array 402 and the transmitter array 404 can include subarrays of patch elements (e.g., microstrip patch antenna subarrays) or dipole elements.

Figure 5:
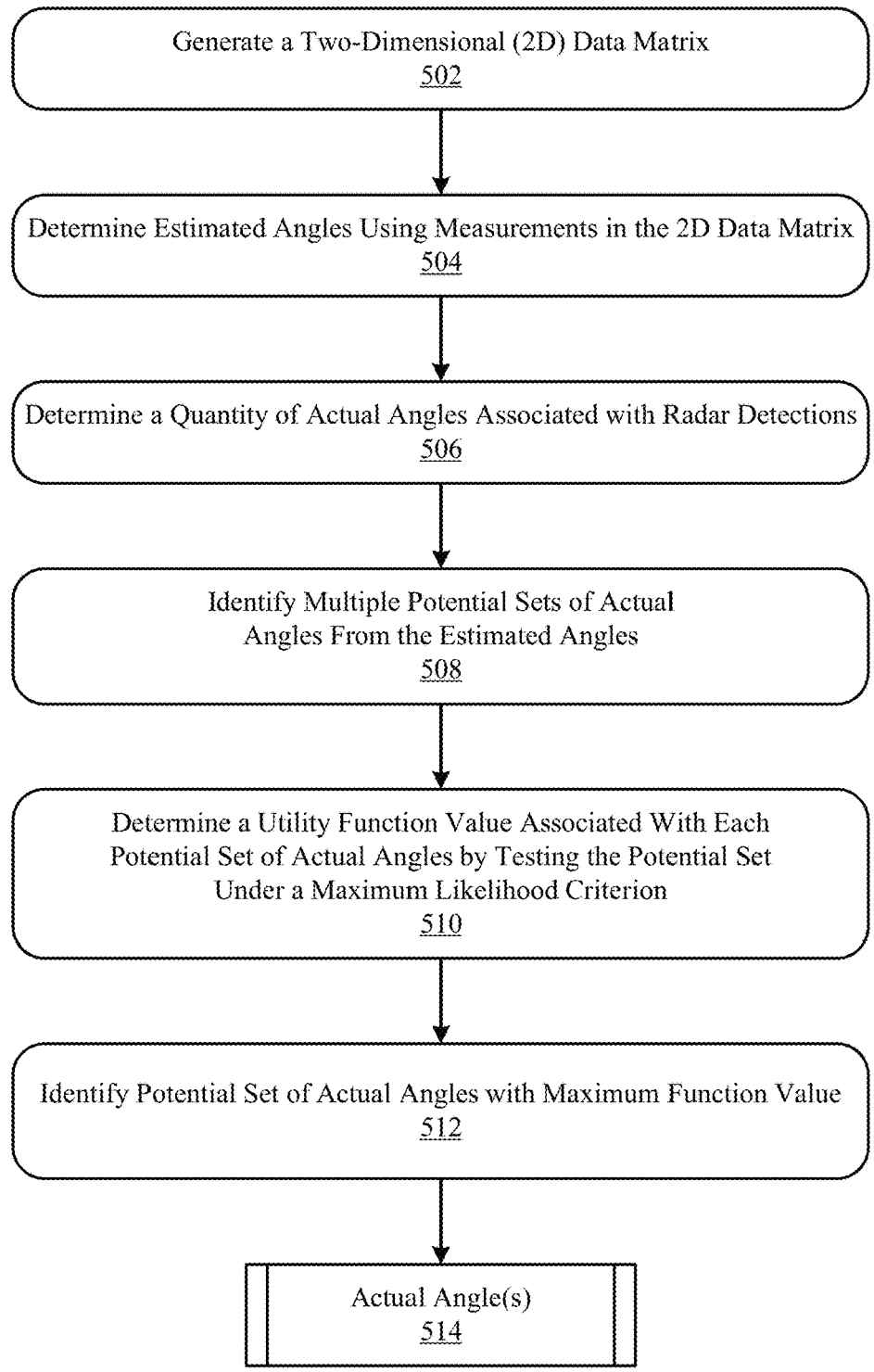
FIG. 5 illustrates an example flowchart of the described techniques and systems for universally detecting DoA and DoD angles in direct-path and multipath reflection conditions.

FIG. 5 illustrates an example flowchart 500 of the described techniques and systems for universally detecting DoA and DoD angles in direct-path and multipath reflection conditions. Flowchart 500 is shown as sets of operations (or acts) performed, but not necessarily limited to the order or combinations in which the operations are shown herein. Further, any of one or more of the operations may be repeated, combined, or reorganized to provide other techniques. The radar system of FIG. 5 can, for example, be the radar system 102 of FIG. 1, which includes the angle-finding module 114. The radar system 102 includes the receiver array 402, which is a sparse ULA with $N_R$ antenna elements 406 spaced apart with the receiver spacing, $d_R$, 408. The radar system 102 also includes the transmitter array 404, which is an array without angular ambiguity (e.g., a sparse MRA).

Because the DoA and DoD angles are measured using the receiver array 402 and the transmitter array 404, respectively, the radar system 102 jointly utilizes the receiver array 402 and the transmitter array 404 to find the intended or actual angles, $\{\alpha_1, \alpha_2, \ldots, \alpha_K\}$. Different from MIMO techniques where a synthetic array is formed by spatially convolving the transmitter and receiver arrays, the radar system 102 may obtain the DoD estimates from the transmitter array observations and the DoA estimates from the receiver array observations. If the set of measured DoD estimates (e.g., as determined from the transmitter array observations) are denoted as $\mathbb{T}=\{\theta_1, \theta_2, \ldots, \theta_M\}$ and the set of measured DoA estimates (e.g., as determined from the receiver array observations) as $\mathbb{R}=\{\phi_1, \phi_2, \ldots, \phi_N\}$, then $\mathbb{D} \subseteq \mathbb{A}$ and $\mathbb{T} \subseteq \mathbb{R}$, where $\mathbb{D}$ stands for the set of DoD angles (e.g., true set of angles) and $\mathbb{A}$ stands for the set of DoA angles (e.g., true set of angles).

It is assumed that there is no noise in the measurements. The inequality between $\mathbb{D}$ and $\mathbb{T}$ ($\mathbb{A}$ and $\mathbb{R}$ as well) may also be caused by the angle estimation ambiguity due to array design. For example, if the receiver array 402 is a ULA with two wavelength spacing, each angle in $\mathbb{A}$ (e.g., true angle) will create four angles in $\mathbb{R}$, where one angle is the true angle and the others are the corresponding aliasings or aliased angles. In this document, M (≥K) is the number of DoD estimates, $\mathbb{T}$, obtained from transmitter array observations, and N (≥K) is the number of DoA estimates, $\mathbb{R}$, obtained from receiver array observations.

Based on the above observation, the angle-finding module 114 provides universal angle estimation regardless of whether direct-path or multipath reflection conditions exist. The angle-finding module 114 utilizes two assumptions (where the roles of the receiver array 402 and transmitter array 404 may be switched). First the transmitter array 404 is designed to estimate the DoD angles without ambiguity ($\mathbb{D}=\mathbb{T}$), while the DoA angles estimated by the receiver array 402 are ambiguous $\mathbb{A} \subset \mathbb{R}$). Second, estimating the DoD angles from transmitter array observations is more computationally expensive than obtaining the ambiguous DoA estimates from receiver array observations.

Without loss of generality, consider that the transmitter array is a MRA with the minimum spacing as half the wavelength of the transmitted EM carrier wave and the receiver array is a sparse ULA with larger than half wavelength spacing (e.g., two wavelengths). It is possible to find out all actual angles $\{\alpha_1, \alpha_2, \ldots, \alpha_K\}$ by using transmitter array observations only, e.g., a non-linear least squares (NLS) method or subspace-based methods when multiple snapshots are available, but it usually requires a large number of computations or snapshots. Resources are generally very limited in automotive radar applications and thus this approach is not practical or possible. In contrast, the angle-finding module 114 can determine the DoA estimates (with ambiguity) relatively easily by applying an efficient FFT method to the sparse ULA of the receiver array.

Figure 6:
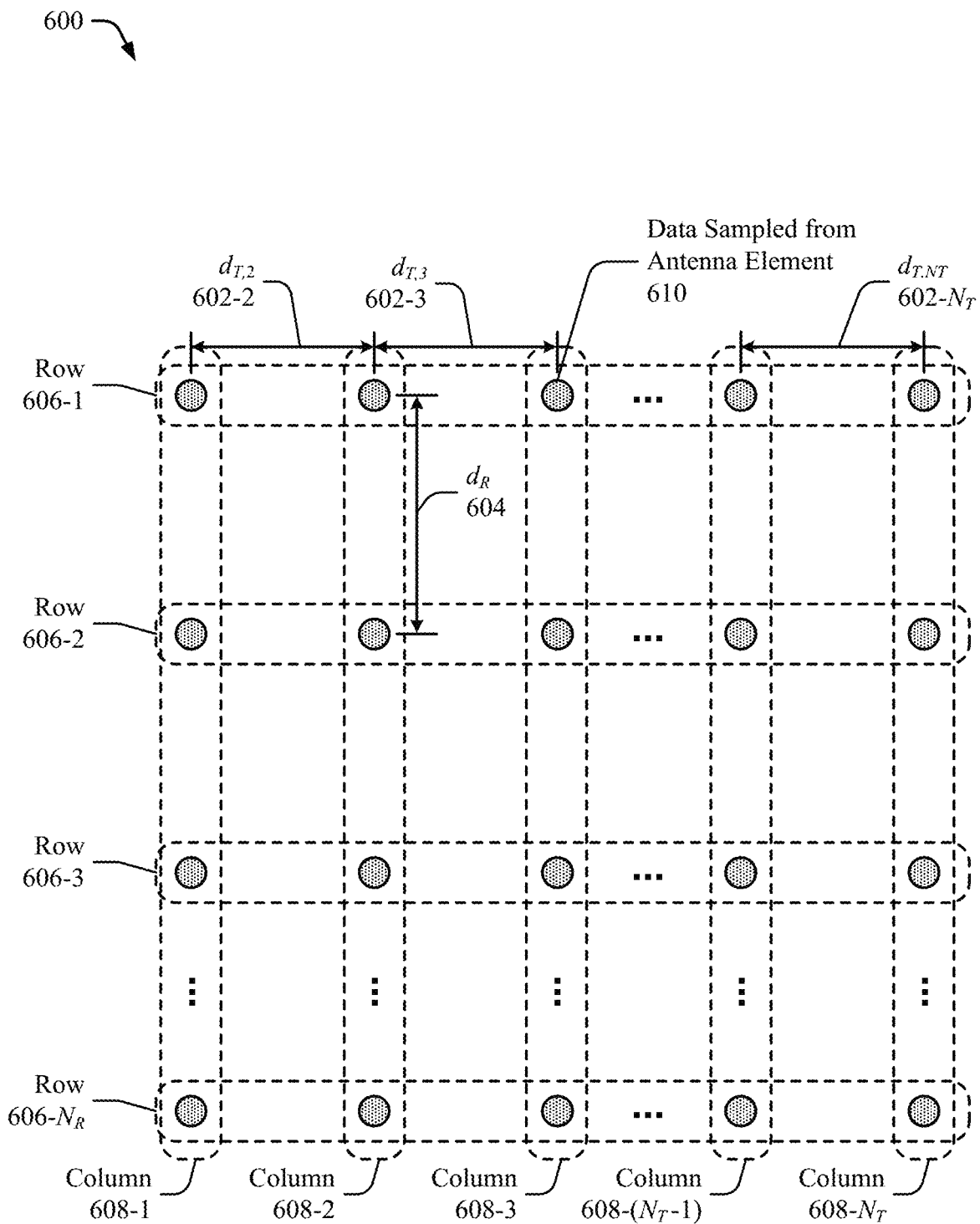
FIG. 6 illustrates an example 2D data matrix generated by the described radar system to universally detect DoA and DoD angles in direct-path and multipath reflection conditions.

At step 502, the angle-finding module 114 generates a two-dimensional (2D) data matrix (e.g., the 2D data matrix 600 of FIG. 6). The angle-finding module 114 reshapes a beam vector of the radar data into the 2D data matrix, Y. In particular, the angle-finding module 114 or processor 110 receives the radar data as an $N_T N_R \times 1$ beam vector. The angle-finding module 114 reshapes this beam vector into an $N_R \times N_T$ complex matrix, Y. The element on the rth row and cth column of Y can be denoted as $y_{r,c}$, the rth row of Y as $Y_{r,:}$, and the cth column of Y as $Y_{:,c}$. The angle-finding module 114 can use the vertical dimension of the 2D data matrix to estimate the DoA angles based on a sparse ULA with the receiver spacing, $d_R$, 408.

At step 504, the angle-finding module 114 determines ambiguous DoA estimates (e.g., estimated angles) using sampled measurements in the 2D data matrix associated with the receiver array 402. In particular, the angle-finding module 114 may use the receiver array measurements or observations to determine the ambiguous DoA estimates, for example, $\mathbb{R}=\{\phi_1, \phi_2, \ldots, \phi_N\}$, associated with the radar detections, which may correspond to direct-path or multipath reflections of the EM energy by the objects 120. The angle-finding module 114 uses a single snapshot of sampled measurements in the 2D data matrix. Because the receiver array 402 is a uniform linear array, the angle-finding module 114 can perform the DoA estimation using a 1D fast Fourier transform (FFT) beamforming based-function. In other implementations, the angle-finding module 114 can also use at least one of several other 1D angular phase estimation algorithms, including a 1D Estimation of Signal Parameters via Rotational Invariance Technique (ESPRIT), a 1D Multiple Signal Classification (MUSIC), or a 1D minimum variance distortionless response (MVDR) beamforming technique. The angle-finding module 114 can use other 1D angular phase estimation methods as well. At a later step, the angle-finding module 114 will then use transmitter array measurements or observations as a reference to pick out the intended angles from the DoA estimates, $\mathbb{R}$.

If the angle-finding module 114 uses an FFT approach, the processing includes applying a 1D FFT to each column of matrix Y and generating $N_T$ FFT spectrums FFT{Y}= [FFT{Y$_{:,1}$}FFT{Y$_{:,2}$} ... FFT{Y$_{:,N_T}$}]. Non-coherent integration (NCI) is then applied to these $N_T$ FFT spectrums by NCI{FFT{Y}}=|FFT{Y$_{:,1}$}|+|FFT{Y$_{:,2}$}|+ . . . +|FFT{Y$_{:,N_T}$}|. The angle-finding module 114 then identifies the peaks in the NCI spectrum NCI{FFT{Y}}. The angles corresponding to these peaks represent the DoA estimated angles for the objects 120.

If the angle-finding module 114 uses a super resolution method (e.g., MVDR, MUSIC, ESPRIT) as the 1D angular phase estimator, the processing includes calculating the covariance matrix $R_Y$ from the measurement snapshots Y by $R_Y=YY^H$. The covariance matrix $R_Y$ is input to the respective super resolution method and the processing steps of that method are performed. The output estimated angles are the DoA angle estimates for the objects 120.

At step 506, the angle-finding module 114 determines the quantity of actual or intended angles associated with radar detections in the 2D data matrix. In particular, the angle-finding module 114 can use the relationship between the array spacing and the number of estimated angles to determine the number, K, of actual angles. If the receiver array 402 has a two-wavelength spacing, each intended angle, $\alpha_k$ (k=1, 2, . . . , K), results in four candidate DoA estimates due to the two-wavelength spacing. Similarly, 2d DoA estimates will be produced if the ULA spacing is d multiples of the wavelength of the emitted EM carrier wave. Returning to the two-wavelength spacing example, only one out of the four DoA estimate candidates corresponds to $\alpha_k$ while the other three (e.g., $\lceil 2d \rceil$−1 for d-wavelength spacing) candidates are its aliased angles or aliasings.

The angle-finding module 114 can also assume the quantity of actual angles is equal to any positive integer value between one and the quantity of estimated angles. For example, if the number of estimated angles (e.g., DoA angle estimates) is equal to four, the angle-finding module 114 can initially assume that the quantity of actual angles (e.g., test values) is equal to 1, 2, 3, or 4. The angle-finding module 114 can later determine, as described below with respect to steps 510 and 512, the quantity of actual angles using a penalty term or value under the maximum likelihood criterion associated with each potential value of K.

At step 508, the angle-finding module 114 identifies multiple potential sets of actual angles (e.g., sets of DoA angle estimates) from the pool or collection of estimated angles. Letting $\mathbb{R}_k=\{\phi_{k,1}, \phi_{k,2}, \ldots, \phi_{k,4}\}$(e.g., $\mathbb{R}_k=\{\phi_{k,1}, \phi_{k,2}, \ldots, \phi_{k,\lceil 2d \rceil}\}$(e.g., for d-wavelength spacing) denote the DoA estimate candidates associated with each intended angle $\alpha_k$, $\alpha_k \in \mathbb{R}_k$ and $\mathbb{R}=\mathbb{R}_1 \cup \mathbb{R}_2 \cup \ldots \cup \mathbb{R}_K$. Thus, there are $4^K$ (e.g., $\lceil 2d \rceil^K$ for d-wavelength spacing) possibilities if each $\mathbb{R}_k$ provides one DoA estimate candidate to form a set of angles under test. Returning to the two-wavelength spacing example with two actual angles, there are four DoA estimate candidates associated with each actual angle $\alpha_k$ (e.g., eight total candidates) and sixteen potential sets of actual angles from the DoA estimate candidates.

At step 510, the angle-finding module 114 determines a utility function value associated with each potential set of actual angles by testing each potential set of actual angles under the maximum likelihood (ML) criterion with transmitter array observations as the reference. By denoting the angles under test as $\{\hat{\alpha}_1, \hat{\alpha}_2, \ldots, \hat{\alpha}_K\}$ with $\hat{\alpha}_k \in \mathbb{R}_k$, $\forall k=1, 2, \ldots, K$, the angle-finding module 114 forms a transmitter array subspace $\cup$ (e.g., a first-array subspace) using the angles under test, as represented by Equation (5):

$$\hat{U} = [\hat{s}_1, \hat{s}_2, \ldots, \hat{s}_K] \quad (5)$$

where $\hat{s}_k$ is the transmitter array steering vector to angle $\hat{\alpha}_k$, $\forall k=1, 2, \ldots, K$. The steering vector $\hat{s}_k$ can be determined using Equation (6):

$$\hat{s}_k = \left[1, e^{j2\pi \frac{D_2}{\lambda} \sin \hat{\alpha}_k}, \ldots, e^{j2\pi \frac{D_{N_T}}{\lambda} \sin \hat{\alpha}_k}\right]^T \quad (6)$$

where $D_2$ represents the distance from the first antenna element 406 to the second antenna element 406 in the transmitter array and to $D_{N_T}$ represents the distance from the first antenna element 406 to the last or $N_T$ antenna element 406 in the transmitter array. The corresponding subspace projection matrix can be obtained using Equation (7):

$$\hat{P} = \hat{U}\left(\hat{U}^H \hat{U}\right)^{-1} \hat{U}^H. \quad (7)$$

The angle-finding module 114 calculates the utility function value under the ML criterion using Equation (8) by taking the Frobenius norm of the matrix product of the projection matrix and the 2D data matrix:

$$\|\hat{P}Y^T\|_F \quad (8)$$

where $Y^T$ is the transpose of the 2D data matrix and $\|\cdot\|_F$ stands for the Frobenius norm of a matrix.

In other implementations, the utility function value under the ML criterion (as represented in Equation (8)) could be replaced or altered using other criteria. For example, the angle-finding module 114 may perform eigen decomposition on the transpose of the 2D data matrix $Y^T$ to obtain the signal subspace matrix to replace $Y^T$ in Equation (8) above, which generally improves estimation accuracy (e.g., by reducing or eliminating noise) but may increase computational complexity. The angle-finding module 114 still forms a first-array subspace using each set of estimated angles and determines the projection matrix as described with respect to Equations (5) and (7) above.

The angle-finding module 114 may also add a penalty term or value to the Frobenius norm term in Equation (8) to impose extra features such as sparsity or enable model order selection to determine the number of angles, K. In such a situation, the angle-finding module 114 identifies potential sets of actual angles for different possible numbers of actual angles and adds a penalty value associated with each possible number of actual angles. When selecting the set of actual angles with the maximum utility function value (as described with respect to step 512), the angle-finding module 114 determines the number of actual angles as the quantity corresponding to the selected set of actual angles. As another example, the utility function computation may be replaced by a cost function computation and the maximization of the utility function value becomes a minimization of the cost function.

At step 512, after calculating the utility function values for $4^K$ (e.g., $\lceil 2d \rceil^K$ for d-wavelength spacing) potential sets of actual angles, the angle-finding module 114 determines the maximum value and the set of actual angles associated with the maximum value, which are designated as the actual angles 514. In this way, the angle-finding module 114 solves the problem of joint DoD and DoA estimation by exploiting the fact that the set of DoDs is the same as the set of DoAs. The flowchart 500 works for direct-path reflection conditions, pure multipath reflection conditions, and hybrid reflection conditions. The described techniques are also suitable for vectorized signal processing, which allows for use of hardware accelerators to increase the computational speed of the flowchart 500 because it applies the same operations to all detections without differentiating direct-path reflection conditions from multipath reflection conditions (e.g., no conditional checks).

When the design of the receiver array 402 and the transmitter array 404 are switched (e.g., the transmitter array 404 is the sparse ULA and the receiver array 402 is the sparse minimum redundancy array or another array design without angle ambiguity), the roles of the receiver array and transmitter array measurements are switched in the flowchart 500.

FIG. 6 illustrates an example 2D data matrix 600 generated by the described radar system to universally detect DoA and DoD angles in direct-path and multipath reflection conditions. The 2D data matrix 600 is generated as part of the flowchart 500 of the angle-finding module 114 as described with respect to FIG. 5.

Consider that the radar system 102 includes $N_T$ antenna elements 406 in a transmitter array and $N_R$ antenna elements 406 in a receiver array. The radar system 102 then includes $N_T N_R$ channels. Generally, radar system 102 receives the radar data as low-level, time-series data in a $N_T N_R \times 1$ beamvector obtained from the antenna arrays, where the quantity of rows is equal to a product of the quantity of antenna elements in the transmitter array and the quantity of antenna elements in the receiver array. The radar data is data sampled from a respective antenna element 610 at a point in time. The angle-finding module 114 can reshape the radar data into the 2D data matrix 600 as a $N_R \times N_T$ complex matrix Y.

In the 2D data matrix 600, the radar data of the ith row 606 is data sampled from the ith receiver antenna element. Similarly, the radar data of the jth column 608 is data sampled from the jth transmitter antenna element. The 2D data matrix 600 includes rows 606-1, 606-2, 606-3, . . . , and 606-$N_R$ and columns 608-1, 608-2, 608-3, . . . , 608-($N_T$–1), and 608-$N_T$. For example, the first row 606-1 is data sampled from the first receiver antenna element and the second column 608-2 is data sampled from the second transmitter antenna element. Mathematically, the vertical dimension of the 2D data matrix 600 can be utilized to measure the DoA angles and the horizontal dimension can be utilized to measure the DoD angles.

EXAMPLES

In the following section, examples are provided.

Example 1: A method comprising: transmitting, through a transmitter array of the radar system, electromagnetic (EM) energy, the transmitter array having a first quantity of antenna elements; receiving, from a receiver array of the radar system, EM energy reflected by one or more objects, the receiver array having a second quantity of antenna elements, the first quantity being equal to or different than the second quantity, a first array of the transmitter array or the receiver array being a sparse array without angle ambiguity within a field-of-view of the first array, a second array of the transmitter array or the receiver array being a sparse uniform linear array; generating, using data samples of the EM energy received at the receiver array, a two-dimensional (2D) data matrix having a quantity of rows equal to a quantity of antenna elements for the first array and a quantity of columns equal to a quantity of antenna elements for the second array; determining, using data in the 2D data matrix associated with the second array, estimated angles associated with radar detections of the one or more objects, the estimated angles including one or more aliased angles and one or more actual angles associated with the radar detections, the radar detections corresponding to direct-path or multipath reflections of the EM energy by the one or more objects; determining a third quantity of the actual angles associated with the radar detections, the third quantity being smaller than or equal to a fourth quantity of the estimated angles; identifying, among the estimated angles, multiple potential sets of actual angles, each respective potential set of actual angles having the third quantity of estimated angles and being different from each other potential set of actual angles; determining utility function values associated with the multiple potential sets of actual angles by testing, using the data in the 2D data matrix associated with the first array, each respective potential set of actual angles under a maximum likelihood criterion; and determining the actual angles associated with the radar detections as a respective set of actual angles with a maximum utility function value among the utility function values.

Example 2: The method of Example 1, wherein determining the third quantity of the actual angles associated with the radar detections is based on the fourth quantity of the estimated angles and spacing between antenna elements of the second array, the spacing being an integer multiple of one half a wavelength of a carrier wave ($\lambda/2$) of the EM energy.

Example 3: The method of Example 2, wherein the determining the third quantity of the actual angles associated with the radar detections comprises dividing the fourth quantity of the estimated angles by the integer multiple.

Example 4: The method of any one of the previous Examples, wherein determining the utility function values associated with the multiple potential sets of actual angles by testing each respective potential set of actual angles under the maximum likelihood criterion comprises forming a first-array subspace using each potential set of actual angles; determining, using the first-array subspace for each potential set of actual angles, a projection matrix; and determining the utility function value by taking a Frobenius norm of a matrix product of the projection matrix and a transpose of the 2D data matrix.

Example 5: The method of Example 4, wherein determining the third quantity of the actual angles associated with the radar detections comprises: initially setting the third quantity equal to the fourth quantity, the third quantity being a positive integer value; identifying test values as each positive integer value equal to or less than the third quantity; identifying the multiple potential sets of actual angles as test sets of actual angles for each test value of the test values; determining the utility function value associated with each respective test set of actual angles by adding a penalty value associated with the respective test value to the Frobenius norm of the matrix product; and determining the third quantity as the test value associated with the maximum utility function value.

Example 6: The method of any one of Examples 1 through 3, wherein determining the utility function values associated with the multiple potential sets of actual angles by testing each respective potential set of actual angles under the maximum likelihood criterion comprises: performing eigen decomposition on a transpose of the 2D data matrix to obtain a signal subspace matrix; forming a first-array subspace using each potential set of actual angles; determining, using the first-array subspace for each potential set of actual angles, a projection matrix; and determining the utility function value by taking a Frobenius norm of a matrix product of the projection matrix and the signal subspace matrix.

Example 7: The method of any one of the previous Examples, wherein determining the estimated angles comprises using a 1D fast Fourier transform (FFT) beamforming based-function.

Example 8: A radar system comprising: a transmitter array configured to transmit electromagnetic (EM) energy having a first quantity of antenna elements; a receiver array configured to receive EM energy reflected by one or more objects, the receiver array having a second quantity of antenna elements, the first quantity being equal to or different than the second quantity, a first array of the transmitter array or the receiver array being a sparse array without angle ambiguity within a field-of-view of the first array, a second array of the transmitter array or the receiver array being a sparse uniform linear array; and one or more processors configured to perform the method of any one of the previous Examples.

Example 9: The radar system of Example 8, wherein the first array is a minimum redundancy array having a minimum spacing among the antenna elements of one half a wavelength of a carrier wave ($\lambda/2$) of the EM energy.

Example 10: The radar system of Example 9, wherein spacings among the antenna elements of the minimum redundancy array are: for three antenna elements, one and two multiples of one half the wavelength of the carrier wave ($\lambda/2$); for four antenna elements, one, three, and two multiples of one half the wavelength of the carrier wave ($\lambda/2$); for five antenna elements, one, three, three, and two multiples of one half the wavelength of the carrier wave ($\lambda/2$) or four, one, two, and six multiples of one half the wavelength of the carrier wave ($\lambda/2$); for six antenna elements, one, five, three, two, and two multiples of one half the wavelength of the carrier wave ($\lambda/2$) or six, one, two, two, and eight multiples of one half the wavelength of the carrier wave ($\lambda/2$); for seven antenna elements, one, three, six, two, three, and two multiples of one half the wavelength of the carrier wave ($\lambda/2$) or fourteen, one, three, six, two, and five multiples of one half the wavelength of the carrier wave ($\lambda/2$); for eight antenna elements, one, one, nine, four, three, three, and two multiples of one half the wavelength of the carrier wave ($\lambda/2$), one, three, six, six, two, three, and two multiples of one half the wavelength of the carrier wave ($\lambda/2$), or eight, ten, one, three, two, seven, and eight multiples of one half the wavelength of the carrier wave ($\lambda/2$); for nine antenna elements, one, three, six, six, six, two, three, and two multiples of one half the wavelength of the carrier wave ($\lambda/2$); or for ten antenna elements, one, two, three, seven, seven, seven, four, four, and one multiples of one half the wavelength of the carrier wave ($\lambda/2$) or sixteen, one, eleven, eight, six, four, three, two, and twenty-two multiples of one half the wavelength of the carrier wave ($\lambda/2$).

Example 11: The radar system of Example 8, wherein the first array is one of a paired staggered array or a coprime array.

Example 12: The radar system of Example 8, wherein: at least one spacing between adjacent antenna elements of the first array is equal to one half a wavelength of a carrier wave ($\lambda/2$) of the EM energy; or a pair of spacings between adjacent antenna elements of the first array satisfies: $|Pm_{1,i_R} - Qm_{1,j_R}|=1$, where P and Q are positive integers, $m_{1,i_R}$ is a first spacing between adjacent antenna elements of the first array, $m_{1,j_R}$ is a second spacing between adjacent antenna elements, the first spacing and the second spacing each being an integer multiple of one half the wavelength of the carrier wave ($\lambda/2$).

Example 13: The radar system of any one of Examples 8 through 12, wherein: the transmitter array is the first array and the receiver array is the second array; and the estimated angles are direction-of-arrival angles.

Example 14: The radar system of any one of Examples 8 through 13, wherein: the transmitter array and the receiver array are positioned in an azimuth direction; and the radar system is configured to be installed on an automobile.

Example 15: A computer-readable storage media comprising computer-executable instructions that, when executed, cause a processor of a radar system to perform the method of any one of Examples 1 through 7.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:
1. A radar system comprising:
a transmitter array configured to transmit electromagnetic (EM) energy having a first quantity of antenna elements;
a receiver array configured to receive EM energy reflected by one or more objects, the receiver array having a second quantity of antenna elements, the first quantity being equal to or different than the second quantity, a first array of the transmitter array or the receiver array being a sparse array without angle ambiguity within a field-of-view of the first array, a second array of the transmitter array or the receiver array being a sparse uniform linear array; and
one or more processors configured to:
generate, using data samples of the EM energy received at the receiver array, a two-dimensional (2D) data matrix having a quantity of rows equal to a quantity of antenna elements for the first array and a quantity of columns equal to a quantity of antenna elements for the second array;

determine, using data in the 2D data matrix associated with the second array, estimated angles associated with radar detections of the one or more objects, the estimated angles including one or more aliased angles and one or more actual angles associated with the radar detections, the radar detections corresponding to direct-path or multipath reflections of the EM energy by the one or more objects;

determine a third quantity of the actual angles associated with the radar detections, the third quantity being smaller than or equal to a fourth quantity of the estimated angles;

identify, among the estimated angles, multiple potential sets of actual angles, each respective potential set of actual angles having the third quantity of estimated angles and being different from each other potential set of actual angles;

determine utility function values associated with the multiple potential sets of actual angles by testing, using the data in the 2D data matrix associated with the first array, each respective potential set of actual angles under a maximum likelihood criterion; and determine the actual angles associated with the radar detections as a respective set of actual angles with a maximum utility function value among the utility function values.

2. The radar system of claim 1, wherein the one or more processors are configured to determine the third quantity of the actual angles associated with the radar detections based on the fourth quantity of the estimated angles and spacing between antenna elements of the second array, the spacing being an integer multiple of one half a wavelength of a carrier wave ($\lambda/2$) of the EM energy.

3. The radar system of claim 2, wherein the one or more processors are configured to determine the third quantity of the actual angles associated with the radar detections by dividing the fourth quantity of the estimated angles by the integer multiple.

4. The radar system of claim 1, wherein the one or more processors are configured to determine the utility function values associated with the multiple potential sets of actual angles by testing each respective potential set of actual angles under the maximum likelihood criterion by:

forming a first-array subspace using each potential set of actual angles;

determining, using the first-array subspace for each potential set of actual angles, a projection matrix; and determining the utility function value by taking a Frobenius norm of a matrix product of the projection matrix and a transpose of the 2D data matrix.

5. The radar system of claim 4, wherein the one or more processors are configured to determine the third quantity of the actual angles associated with the radar detections by:

initially setting the third quantity equal to the fourth quantity, the third quantity being a positive integer value;

identifying test values as each positive integer value equal to or less than the third quantity;

identifying the multiple potential sets of actual angles as test sets of actual angles for each test value of the test values;

determining the utility function value associated with each respective test set of actual angles by adding a penalty value associated with the respective test value to the Frobenius norm of the matrix product; and determining the third quantity as the test value associated with the maximum utility function value.

6. The radar system of claim 1, wherein the one or more processors are configured to determine the utility function values associated with the multiple potential sets of actual angles by testing each respective potential set of actual angles under the maximum likelihood criterion by:

performing eigen decomposition on a transpose of the 2D data matrix to obtain a signal subspace matrix;

forming a first-array subspace using each potential set of actual angles;

determining, using the first-array subspace for each potential set of actual angles, a projection matrix; and determining the utility function value by taking a Frobenius norm of a matrix product of the projection matrix and the signal subspace matrix.

7. The radar system of claim 1, wherein the first array is a minimum redundancy array having a minimum spacing among the antenna elements of one half a wavelength of a carrier wave ($\lambda/2$) of the EM energy.

8. The radar system of claim 7, wherein spacings among the antenna elements of the minimum redundancy array are:

for three antenna elements, one and two multiples of one half the wavelength of the carrier wave ($\lambda/2$);

for four antenna elements, one, three, and two multiples of one half the wavelength of the carrier wave ($\lambda/2$);

for five antenna elements, one, three, three, and two multiples of one half the wavelength of the carrier wave ($\lambda/2$) or four, one, two, and six multiples of one half the wavelength of the carrier wave ($\lambda/2$);

for six antenna elements, one, five, three, two, and two multiples of one half the wavelength of the carrier wave ($\lambda/2$) or six, one, two, two, and eight multiples of one half the wavelength of the carrier wave ($\lambda/2$);

for seven antenna elements, one, three, six, two, three, and two multiples of one half the wavelength of the carrier wave ($\lambda/2$) or fourteen, one, three, six, two, and five multiples of one half the wavelength of the carrier wave ($\lambda/2$);

for eight antenna elements, one, one, nine, four, three, three, and two multiples of one half the wavelength of the carrier wave ($\lambda/2$), one, three, six, six, two, three, and two multiples of one half the wavelength of the carrier wave ($\lambda/2$), or eight, ten, one, three, two, seven, and eight multiples of one half the wavelength of the carrier wave ($\lambda/2$);

for nine antenna elements, one, three, six, six, six, two, three, and two multiples of one half the wavelength of the carrier wave ($\lambda/2$); or for ten antenna elements, one, two, three, seven, seven, seven, four, four, and one multiples of one half the wavelength of the carrier wave ($\lambda/2$) or sixteen, one, eleven, eight, six, four, three, two, and twenty-two multiples of one half the wavelength of the carrier wave ($\lambda/2$).

9. The radar system of claim 1, wherein the first array is one of a paired staggered array or a coprime array.

10. The radar system of claim 1, wherein:

at least one spacing between adjacent antenna elements of the first array is equal to one half a wavelength of a carrier wave ($\lambda/2$) of the EM energy; or a pair of spacings between adjacent antenna elements of the first array satisfies:

$$|Pm_{1,i_R} - Qm_{1,j_R}| = 1,$$

where P and Q are positive integers, $m_{1,i_R}$ is a first spacing between adjacent antenna elements of the first array, $m_{1,j_R}$ is a second spacing between adjacent antenna elements, the first spacing and the second spacing each being an integer multiple of one half the wavelength of the carrier wave ($\lambda/2$).

11. The radar system of claim 1, wherein:
the transmitter array is the first array and the receiver array is the second array; and
the estimated angles are direction-of-arrival angles.

12. The radar system of claim 1, wherein:
the transmitter array and the receiver array are positioned in an azimuth direction; and
the radar system is configured to be installed on an automobile.

13. The radar system of claim 1, wherein the one or more processors are configured to determine the estimated angles using a 1D fast Fourier transform (FFT) beamforming based-function.

14. A Non-transitory computer-readable storage media comprising computer-executable instructions that, when executed, cause a processor of a radar system to:
transmit, through a transmitter array of the radar system, electromagnetic (EM) energy, the transmitter array having a first quantity of antenna elements;
receive, from a receiver array of the radar system, EM energy reflected by one or more objects, the receiver array having a second quantity of antenna elements, the first quantity being equal to or different than the second quantity, a first array of the transmitter array or the receiver array being a sparse array without angle ambiguity within a field-of-view of the first array, a second array of the transmitter array or the receiver array being a sparse uniform linear array;
generate, using data samples of the EM energy received at the receiver array, a two-dimensional (2D) data matrix having a quantity of rows equal to a quantity of antenna elements for the first array and a quantity of columns equal to a quantity of antenna elements for the second array;
determine, using data in the 2D data matrix associated with the second array, estimated angles associated with radar detections of the one or more objects, the estimated angles including one or more aliased angles and one or more actual angles associated with the radar detections, the radar detections corresponding to direct-path or multipath reflections of the EM energy by the one or more objects;
determine a third quantity of the actual angles associated with the radar detections, the third quantity being smaller than or equal to a fourth quantity of the estimated angles;
identify, among the estimated angles, multiple potential sets of actual angles, each respective potential set of actual angles having the third quantity of estimated angles and being different from each other potential set of actual angles;
determine utility function values associated with the multiple potential sets of actual angles by testing, using the data in the 2D data matrix associated with the first array, each respective potential set of actual angles under a maximum likelihood criterion; and
determine the actual angles associated with the radar detections as a respective set of actual angles with a maximum utility function value among the utility function values.

15. The non-transitory computer-readable storage media of claim 14, wherein the computer-readable storage media comprises further computer-executable instructions that, when executed, cause the processor to determine the third quantity of the actual angles associated with the radar detections based on the fourth quantity of the estimated angles and spacing between antenna elements of the second array, the spacing being an integer multiple of one half a wavelength of a carrier wave ($\lambda/2$) of the EM energy.

16. The non-transitory computer-readable storage media of claim 15, wherein the computer-readable storage media comprises further computer-executable instructions that, when executed, cause the processor to determine the third quantity of the actual angles associated with the radar detections by dividing the fourth quantity of the estimated angles by the integer multiple.

17. The non-transitory computer-readable storage media of claim 14, wherein the computer-readable storage media comprises further computer-executable instructions that, when executed, cause the processor to determine the utility function values associated with the multiple potential sets of actual angles by testing each respective potential set of actual angles under the maximum likelihood criterion by:
forming a first-array subspace using each potential set of actual angles;
determining, using the first-array subspace for each potential set of actual angles, a projection matrix; and
determining the utility function value by taking a Frobenius norm of a matrix product of the projection matrix and a transpose of the 2D data matrix.

18. The non-transitory computer-readable storage media of claim 14, wherein the computer-readable storage media comprises further computer-executable instructions that, when executed, cause the processor to determine the utility function values associated with the multiple potential sets of actual angles by testing each respective potential set of actual angles under the maximum likelihood criterion by:
performing eigen decomposition on a transpose of the 2D data matrix to obtain a signal subspace matrix;
forming a first-array subspace using each potential set of actual angles;
determining, using the first-array subspace for each potential set of actual angles, a projection matrix; and
determining the utility function value by taking a Frobenius norm of a matrix product of the projection matrix and the signal subspace matrix.

19. The non-transitory computer-readable storage media of claim 14, wherein the computer-readable storage media comprises further computer-executable instructions that, when executed, cause the processor to determine the estimated angles using a 1D fast Fourier transform (FFT) beamforming based-function.

20. A method comprising:
transmitting, through a transmitter array of the radar system, electromagnetic (EM) energy, the transmitter array having a first quantity of antenna elements;
receiving, from a receiver array of the radar system, EM energy reflected by one or more objects, the receiver array having a second quantity of antenna elements, the first quantity being equal to or different than the second quantity, a first array of the transmitter array or the receiver array being a sparse array without angle ambiguity within a field-of-view of the first array, a second array of the transmitter array or the receiver array being a sparse uniform linear array;

generating, using data samples of the EM energy received at the receiver array, a two-dimensional (2D) data matrix having a quantity of rows equal to a quantity of antenna elements for the first array and a quantity of columns equal to a quantity of antenna elements for the second array;

determining, using data in the 2D data matrix associated with the second array, estimated angles associated with radar detections of the one or more objects, the estimated angles including one or more aliased angles and one or more actual angles associated with the radar detections, the radar detections corresponding to direct-path or multipath reflections of the EM energy by the one or more objects;

determining a third quantity of the actual angles associated with the radar detections, the third quantity being smaller than or equal to a fourth quantity of the estimated angles;

identifying, among the estimated angles, multiple potential sets of actual angles, each respective potential set of actual angles having the third quantity of estimated angles and being different from each other potential set of actual angles;

determining utility function values associated with the multiple potential sets of actual angles by testing, using the data in the 2D data matrix associated with the first array, each respective potential set of actual angles under a maximum likelihood criterion; and determining the actual angles associated with the radar detections as a respective set of actual angles with a maximum utility function value among the utility function values.

* * * * *